United States Patent [19]

Mizukoshi et al.

[11] Patent Number: 4,472,754
[45] Date of Patent: Sep. 18, 1984

[54] SURGE ARRESTER WITH A BYPASS GAP

[75] Inventors: Akio Mizukoshi, Katsuta; Katuji Shindo, Hitachi; Yoshi Akatsu, Tohkai; Jun Ozawa, Hitachi, all of Japan

[73] Assignee: Hitachi, Ltd., Tokyo, Japan

[21] Appl. No.: 398,858

[22] Filed: Jul. 16, 1982

[30] Foreign Application Priority Data

Jul. 31, 1981 [JP] Japan ................................ 56-119086

[51] Int. Cl.³ ............................................. H02H 3/22
[52] U.S. Cl. .................................................. 361/127
[58] Field of Search ............... 361/124, 126, 127, 128; 338/21

[56] References Cited

U.S. PATENT DOCUMENTS 3,733,520  5/1973  Schei ................................ 338/21 X

FOREIGN PATENT DOCUMENTS 15151   2/1979  Japan ................................ 361/127
698092  11/1979  U.S.S.R. ............................ 361/127

Primary Examiner—Harry E. Moose, Jr.
Attorney, Agent, or Firm—Antonelli, Terry & Wands

[57] ABSTRACT

A surge arrester having a first non-linear resistor block, a second non-linear resistor block connected in series with the first non-linear resistor block, a bypass gap connected in parallel with the second non-linear resistor block, and a linear resistor connected in parallel with at least one of the first and second non-linear resistor blocks.

14 Claims, 5 Drawing Figures

SURGE ARRESTER WITH A BYPASS GAP

BACKGROUND OF THE INVENTION

The present invention relates to a surge arrester using non-linear resistor made mainly of zinc oxide and more particularly a surge arrester having a bypass gap for shorting a part of the resistor.

An excellent non-linearity of the zinc oxide resistor realized the surge arresters without serially connected discharge gaps. However, for the surge arresters in which the protection level is required to be sufficiently low with respect to the continuous operating voltage of the surge arrester, the non-linearity characteristic of the zinc oxide resistor is not enough. For this reason it is the conventional practice to permit a discharge to occur in the discharge gap connected in parallel with the non-linear resistor block during the surge absorbing operation of the surge arrester so as to shortcircuit a part of the resistor and thereby lower the protection level.

The inventors of this invention have found that in this kind of surge arrester there is a possibility of an overvoltage occurring in the bypass gap leading to the restriking of arc.

SUMMARY OF THE INVENTION

The object of this invention is to provide a surge arrester with a bypass gap capable of preventing the restriking of arc in the bypass gap.

DESCRIPTION OF THE PREFERRED EMBODIMENTS

The inventors of this invention have found new problems involving this kind of surge arresters. They are explained in the following.

Figure 1:
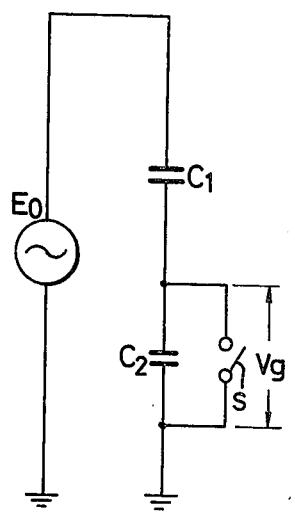
FIG. 1 illustrates an electrically equivalent circuit to a surge arrester with a bypass gap.

Non-linear resistors composed mainly of zinc oxide have a very large dielectric constant. Thus, the surge arrester with a bypass gap is represented by the electrically equivalent circuit of FIG. 1. The bypass gap in which a discharge occurred and then the arc ceased is equivalent to a switch that was closed and then opened. The non-linear resistors are represented by capacitors $C_1$ and $C_2$.

With the switch S closed the voltage across the capacitor $C_1$ is equal to the applied voltage $E_0$ and the voltage across the capacitor $C_2$ is zero. let $E_0$ be a sinusoidal commercial frequency voltage and then the voltage $V_g$ appearing across the $C_2$ after the which S is closed may be expressed as $$V_g = E_0 \frac{C_1}{C_1 + C_2} \left\{ \frac{1}{\sqrt{\frac{\omega^2}{a^2} + 1}} \sin(\omega t + \phi) \right. \tag{1}$$

$$\left. \frac{\sin\phi}{\sqrt{\frac{\omega^2}{a^2} + 1}} \cdot e^{-at} - \frac{V_c}{E_0}(1 - e^{-at}) \right\}$$

$$\phi = \tan^{-1}\left(\frac{a\sin\theta - \omega\cos\theta}{\omega\sin\theta - a\cos\theta}\right)$$

$$a = \frac{1}{R}\left(\frac{1}{C_1} + \frac{1}{C_2}\right)$$

where $V_c$ is an initial voltage of $C_1$, $\theta$ is a phase at which the switch S opens, $\omega$ is an angular frequency of an AC power source and R is a resistance of the power source.

Figure 2:
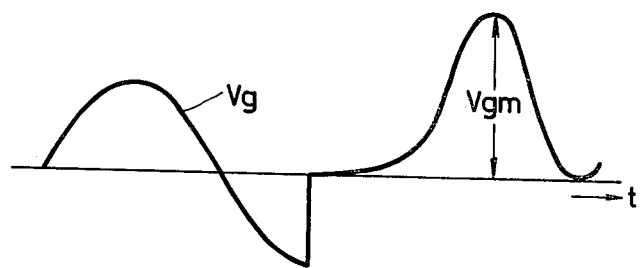
FIG. 2 is a voltage waveform appearing in the bypass gap of FIG. 1.

The above relationship is shown in FIG. 2. $V_g$ contains a direct current component and assumes the maximum value during the next halfwave after the switch S was closed, the maximum value being $V_{gm}$ which is twice the voltage that was present before the switch was closed. With such a high voltage applied there is a possibility of an arc restriking.

Figure 3:
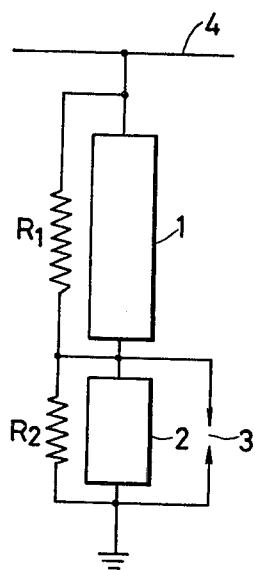
FIG. 3 illustrates circuitry representing a surge arrester with a bypass gap of one embodiment of this invention; and FIG. 4

FIG. 3 illustrates a surge arrester with a bypass gap using non-linear resistor elements 1 and 2 composed mainly of zinc oxide. The non-linear resistor element 2 is connected in parallel with the bypass gap 3. The non-linear resistor elements 1 and 2 are each provided with parallelly connected linear resistors $R_1$ and $R_2$, respectively. The surge arrester constructed as described above is usally installed in a container filled with a sulfur hexafluoride ($SF_6$) gas with one terminal connected to the main circuit 4 and the other grounded.

Suppose the equivalent electrostatic capacity of the non-linear resistor elements 1 and 2 is $C_1$ and $C_2$. Then the discharge time constant is given by $$T = \frac{R_1 \cdot R_2(C_1 + C_2)}{(R_1 + R_2)} \tag{2}$$

When either $R_1$ or $R_2$ is sufficiently large, for example $R_1$ is infinity, then $$T = \frac{R_1 \cdot R_2(C_1 + C_2)}{(R_1 + R_2)} \approx R_2(C_1 + C_2) \tag{3}$$

Thus, by selecting the time constant at a value sufficiently smaller than the cycle of AC voltage, it is possible to extinguish the transient overvoltage before the AC voltage reaches its peak thereby reducing $V_{gm}$ to less than twice the peak value. Let $T_{AC}$ represent the cycle of AC voltage and it will be seen from the equation (1) that the time at which $V_g$ reaches its maximum is somewhere between $\frac{1}{4} T_{AC}$ and $\frac{1}{2} T_{AC}$. Thus if the term of transient voltage is extinguished within a time shorter than $\frac{1}{4} T_{AC}$, then the overshoot of $V_g$ can be suppressed. In practice, if the time constant of the transient voltage term is represented by T and if the relation $3T < \frac{1}{4}T_{AC}$ is maintained, then the effect of the transient voltage term can be suppressed to about 5%. The linear resistor that meets the above requirement under AC voltage with the main circuit 4 energized has a resistance smaller than the resistance of the non-linear resistor element which is connected in parallel with the linear resistor. That is, as shown in the circuit of FIG. 3, the value of the linear resistor $R_1$ is smaller than the value of the non-linear resistor element 1 which is connected in parallel therewith under AC voltage with the main circuit 4 energized and, likewise, the value of the linear resistor $R_2$ is smaller than the value of the non-linear resistor element 2 which is connected in parallel therewith under AC voltage with the main circuit 4 energized. In FIG. 3, if the linear resistors $R_1$ and $R_2$ parallelly connected with the non-linear resistor elements 1 and 2 are arranged to maintain the following relationship $$C_1 R_1 = C_2 R_2 < \frac{T_{AC}}{12}$$

then the overshoot of transient voltage can be held to less than about 5% and a flat voltage dividing characteristic for frequency can be provided.

When $C_1 R_1 \neq C_2 R_2$, the same effect can be obtained by arranging the linear resistors $R_1$ and $R_2$ to meet the relationship $$C_1 R_1 \text{ or } C_2 R_2 < \frac{T_{AC}}{12}.$$

Figure 4:
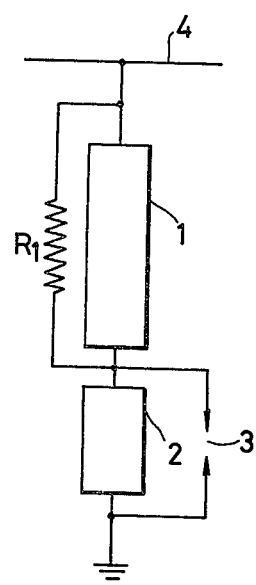

FIG. 4 illustrates another embodiment of surge arrester in which members alike to those shown in FIG. 3 carry like reference numbers. Only the non-linear resistor element 1 is provided with a parallel linear resistor $R_1$. The discharge time constant is $T = R_1(C_1 + C_2)$.

Figure 5:
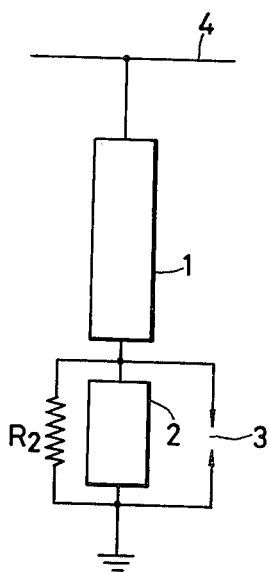
FIG. 5 illustrates circuitry of surge arresters with a bypass gap of other embodiments.

FIG. 5 shows still another embodiment of surge arrester in which only a non-linear resistor element 2 is provided with a parallel linear resistor $R_2$. The discharge time constant of this embodiment is $T = R_2(C_1 + C_2)$.

We claim:

1. A surge arrester with a bypass gap comprising: a first non-linear resistor block; a second non-linear resistor block connected in series with the first non-linear resistor block; a bypass gap connected in parallel with the second non-linear resistor block; and a linear resistor connected in parallel with at least one of the first and second non-linear resistor blocks.

2. A surge arrester with a bypass gap as defined in claim 1, wherein the linear resistor with AC voltage applied exhibits a resistance smaller than the resistance of the non-linear resistor block which is connected in parallel with the linear resistor.

3. A surge arrester with a bypass gap as defined in claim 1, wherein the first and second non-linear blocks are formed mainly of zinc oxide.

4. A surge arrester with a bypass gap as defined in claim 1, wherein the linear resistor is connected in parallel with the first non-linear resistor block.

5. A surge arrester with a bypass gap as defined in claim 1, wherein the linear resistor is connected in parallel with the second non-linear resistor block.

6. A surge arrester with a bypass gap as defined in claim 1, wherein two linear resistors are provided, one linear resistor being connected in parallel with the first non-linear resistor block, and the other linear resistor being connected in parallel with the second non-linear resistor block.

7. A surge arrester with a bypass gap as defined in claim 6, wherein the one linear resistor with AC voltage applied exhibits a resistance smaller than the resistance of the first non-linear resistor block which is connected in parallel therewith, and the other linear resistor with AC voltage applied exhibits a resistance smaller than the resistance of the second non-linear resistor block which is connected in parallel therewith.

8. A surge arrester with a bypass gap as defined in claim 7, wherein the first and second non-linear resistor blocks are formed mainly of zinc oxide.

9. A surge arrester with a bypass gap comprising a first non-linear resistor block, a second non-linear resistor block connected in series with the first non-linear resistor block, a bypass gap connected in parallel with the second non-linear resistor block, and means for reducing a transient voltage which appears after a sparking of the bypass gap so as to prevent restriking of an arc, the means for reducing the transient voltage including a linear resistor connected in parallel with at least one of the first and second non-linear resistor blocks.

10. A surge arrester with a bypass gap as defined in claim 9, wherein the first and second non-linear resistor blocks are formed mainly of zinc oxide.

11. A surge arrester with a bypass gap as defined in claim 10, wherein the linear resistor with AC voltage applied exhibits a resistance smaller than the resistance of the non-linear resistor block which is connected in parallel therewith.

12. A surge arrester with a bypass gap as defined in claim 11, wherein the linear resistor is connected in parallel with the first non-linear resistor block.

13. A surge arrester with a bypass gap as defined in claim 11, wherein the linear resistor is connected in parallel with the second non-linear resistor block.

14. A surge arrester with a bypass gap as defined in claim 11, wherein two linear resistors are provided, one linear resistor being connected in parallel with the first non-linear resistor block, and the other linear resistor being connected in parallel with the second non-linear resistor block.

* * * * *